(12) United States Patent
Harlukowicz et al.

(10) Patent No.: US 6,642,351 B1
(45) Date of Patent: Nov. 4, 2003

(54) DISPERSAL OF POLYACRYLAMIDES

(75) Inventors: John Harlukowicz, Hamden, CT (US); Morris Lewellyn, Stratford, CT (US); Roderick G. Ryles, Milford, CT (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 09/604,298

(22) Filed: Jun. 26, 2000

(51) Int. Cl.$^7$ ................................................ C08F 6/00
(52) U.S. Cl. ...................................................... 528/502
(58) Field of Search ........................................ 528/502

(56) References Cited

U.S. PATENT DOCUMENTS

| | | | | |
|---|---|---|---|---|
| 4,077,612 A | | 3/1978 | Ricciardi | 366/102 |
| 4,086,663 A | | 4/1978 | Croft | 366/154 |
| 4,390,284 A | | 6/1983 | Hyde et al. | 366/165 |
| 4,499,214 A | | 2/1985 | Sortwell | 523/336 |
| 4,518,261 A | * | 5/1985 | Sekimoto et al. | 366/150 |
| 4,529,794 A | | 7/1985 | Sortwell et al. | 528/499 |
| 4,531,673 A | | 7/1985 | Holland et al. | 239/113 |
| 4,603,156 A | | 7/1986 | Sortwell | 523/324 |
| 4,605,689 A | * | 8/1986 | Witheford | 523/313 |
| 4,643,582 A | | 2/1987 | Ricciardi | 366/102 |
| 4,673,704 A | | 6/1987 | Flesher et al. | 524/519 |
| 4,688,945 A | | 8/1987 | Brazelton et al. | 366/156 |
| 4,725,379 A | * | 2/1988 | Baumgartner et al. | 252/314 |
| 4,845,192 A | | 7/1989 | Sortwell et al. | 528/499 |
| 4,874,588 A | | 10/1989 | Sortwell et al. | 422/269 |
| 5,161,887 A | * | 11/1992 | Goldberg | 366/139 |
| 5,171,781 A | | 12/1992 | Farrar et al. | 524/547 |
| 5,344,619 A | | 9/1994 | Larwick et al. | 422/261 |
| 5,368,385 A | | 11/1994 | Adamo et al. | 366/139 |
| 5,407,975 A | | 4/1995 | Pardikes | 523/348 |
| 5,599,101 A | | 2/1997 | Pardikes | 366/165.1 |
| 5,626,422 A | | 5/1997 | Adamo et al. | 366/173.1 |
| 5,660,466 A | | 8/1997 | Hopson et al. | 366/137.1 |
| 5,849,862 A | | 12/1998 | Davies et al. | 528/502 E |
| 5,879,080 A | | 3/1999 | Pardikes | 366/165.1 |
| 5,947,596 A | | 9/1999 | Dowd | 366/152.6 |

FOREIGN PATENT DOCUMENTS

WO WO 9734945 9/1997 .............. C08J/3/12

OTHER PUBLICATIONS

US 4,507,470, 3/1985, Sortwell et al. (withdrawn)
Product Literature—Powdercat–Dry Systems, (pp. 1–2).
Product Literature—Polyblend DP Series System, (pp. 1–6).
ASTME 11–95, Standard Specificationfor Wire Cloth and Sieves for Testing Purposes, (pp. 1–5).
Product Literature—Polymair Model 512 Packaged Polyelectrolyte Processing Module, (pp. 1–3).
Product Literature—Eductors, (pp. 1–10).
Product Literature—Powdercat–Dry Polymer Processing, (pp. 1–3).

* cited by examiner

*Primary Examiner*—Paul R. Michl
(74) *Attorney, Agent, or Firm*—Joseph J. Mallon; Liza Negron

(57) ABSTRACT

Polymer compositions comprised of small, dry polyacrylamide particles may be dispersed into water at industrially useful rates to form aqueous compositions, by separating the particles from each other and bringing them into contact with a moving stream of water in the manner described herein. The resulting aqueous compositions may be used as a treating solution in diverse applications such as flocculants in water treating, papermaking, mining, oil field, and biotechnological separations.

18 Claims, No Drawings

DISPERSAL OF POLYACRYLAMIDES

BACKGROUND OF THE INVENTION

This invention relates to methods for improving the dispersal of finely divided dry polyacrylamide particles in water and to methods of using the resulting aqueous compositions.

Polyacrylamides are widely used in a variety of industrial applications, including the flocculation of suspended solids such as biological solids, e.g., sewage sludge, mineral slurries, oily water and cellulosic slurries. The user typically employs the polyacrylamide in the form of an aqueous composition containing from about 0.01% to about 1% of dispersed polyacrylamide. The polyacrylamide may be water-soluble, in which case the aqueous composition may be a polyacrylamide solution comprised of dissolved polyacrylamide, or the polyacrylamide may be water-swellable, in which case the aqueous composition may be comprised of swollen polyacrylamide particles. The aqueous composition may also be comprised of a mixture of dissolved polyacrylamide and swollen polyacrylamide particles. Flocculation may be accomplished by adding the aqueous composition to the suspended solids in a manner that is generally well known to those skilled in the art.

The manufacturers and suppliers of polyacrylamides typically provide the polymer to the user in a concentrated form in order to reduce shipping costs. Concentrated forms include concentrated polymer solutions, dry polymers, water-in-oil emulsions, water-in-oil microemulsions, aqueous dispersions, dispersions of the polymer in oil, etc. In order to convert the concentrated form into the dispersed form required for the particular application, the user generally intermixes the concentrated form with water to the extent necessary to provide an aqueous composition having the desired level of dispersed polyacrylamide.

Each form of concentrated polymer has advantages and disadvantages. Dry forms in which the polymer is less hydrated generally contain from about 5 to about 30% water and thus tend to have an advantageously high concentration of active polymer. However, in many cases they are disadvantageously more difficult to dissolve than other forms containing greater amounts of water in which the polymer is more fully hydrated, particularly when the molecular weight of the polymer is high, e.g., about 100,000 or greater.

The dispersal rate of dry particulate polymers may also be influenced by the size of the particles. In commercial practice dry forms are generally supplied to the user in the form of particulate polymer compositions having a number average particle size in the range of about 500 microns to about 1500 microns. When the particles are too large, dispersal may be too slow for practical commercial use. Optimum dispersal rates are generally observed at intermediate particle sizes. Smaller particle sizes are generally disfavored because of handling problems, e.g., dusting, caking etc.

Polymer compositions which contain polyacrylamide particles having a particle size of about 300 microns or less may be especially problematic because these small particles generally disperse more slowly in water than larger particles. Examples 44–49 of U.S. Pat. No. 5,849,862, the entire disclosure of which is hereby incorporated herein by reference, demonstrate that the smaller particles of precipitated and spray-dried polyacrylamides dissolved more slowly than the corresponding agglomerated forms of the same polyacrylamides having a larger particle size, see Table 9 of U.S. Pat. No. 5,849,862. It is believed that smaller particles disperse more slowly because they have a strong tendency to stick together upon contact with water to form globules or so-called "fisheyes." Formation of these fisheyes is generally undesirable not only because of their tendency to disperse slowly but also because the fisheyes may not pass easily through small orifices and thus may undesirably clog equipment and slow production.

One approach to the problem of slow dispersal of small polymer particles has been to agglomerate the smaller dry particles to form larger dry particles which disperse more quickly, see, e.g., U.S. Pat. No. 5,849,862. Other approaches to this problem include dispersing the polymer into a liquid carrier in which the polymer is insoluble to form a suspension, then adding the suspension to water, see, e.g., U.S. Pat. No. 4,499,214; and dispersing the polymer into an aqueous solution of an equilibrating agent, see, e.g., U.S. Pat. No. 4,673,704. However, these approaches have not been entirely satisfactory because they may involve additional inconvenient and/or expensive processing steps. Fisheye production may be avoided or reduced by adding the polymer to the water at an extremely slow rate, but the resulting delays in production and/or low level of dispersed polymer in the resulting aqueous composition may be commercially impractical. The fisheyes may be stirred in water for extended periods until they disperse, but this may also undesirably delay production. The fisheyes may be removed e.g. filtered from the aqueous composition, but removal may be cumbersome and the resulting aqueous composition may have a lower polymer content than desired. The dispersal problem may be mitigated somewhat by preparing the dry polymer in such a way as to avoid or reduce the formation of small polymer particles, but in some cases the natural tendency of the process may be to produce small particles, see, e.g., the spray-drying process of U.S. Pat. No. 5,849,862.

A great variety of mechanical devices and techniques have been disclosed for dispersing polymers in water, see, e.g., U.S. Pat. Nos. 4,077,612; 4,086,663; 4,390,284; 4,507,470; 4,518,261; 4,529,794; 4,531,673; 4,603,156; 4,643,582; 4,688,945; 4,845,192; 4,874,588; 5,171,781; 5,344,619; 5,368,385; 5,407,975; 5,599,101; 5,626,422; 5,660,466; 5,879,080; 5,947,596 and WO 97/34945. However, to our knowledge, none of these disclosures is particularly directed to the problem of rapidly dispersing commercially significant quantities of very small polyacrylamide particles in water to provide uniform aqueous compositions containing dispersed polymer.

Manufacturers may occasionally produce batches of dry polyacrylamide particles which have a particle size below that specified by the user i.e., "off-spec" batches. These batches frequently present a problem for the manufacturer who must often choose to either dispose of them, at significant cost, or provide them to the user at a substantial discount in price, at possible risk to the manufacturer's reputation for quality. To our knowledge, no manufacturer is currently supplying the flocculation market with commercially significant quantities of dry polyacrylamides having a number average particle size below about 300 microns as part of its regular "on-spec" production. It would be beneficial for manufacturers to be able to supply small polyacrylamide particles directly to the market. In the aforementioned spray-drying process, where there is a natural tendency to produce small polyacrylamide particles, the need for agglomeration could be avoided or reduced. Also, manufacturers could profitably sell "off-spec" batches to the market without damaging their valuable reputations. However, there appears to be a lack of demand for small polyacrylamide particles that is directly related to the various aforementioned problems, and particularly the problem of dispersing small polyacrylamide particles in water. Therefore, there remains a need for a method which provides a solution to the dispersal problem.

BRIEF SUMMARY OF THE INVENTION

This invention provides a method for improving the dispersal of small polyacrylamide particles in water to form aqueous compositions comprised of commercially useful amounts of homogeneously dispersed polyacrylamide. The aqueous compositions formed by this method have such a low fisheye content that greater than about 90% by weight of the aqueous composition passes through a 50 mesh screen within about 15 minutes after being formed. This rapid and efficient dispersal of polymer particles in water is achieved by separating the dry polyacrylamide particles from each other to form an airborne stream of separated polyacrylamide particles, then contacting this airborne stream with a stream of flowing water to form the desired aqueous compositions.

In a preferred embodiment, the invention provides a method for improving the dispersal of a polymer composition in water, comprising (a) providing a dry polymer composition comprised of a plurality of polyacrylamide particles, wherein at least about 90% by weight of said polyacrylamide particles have a particle size of about 300 microns or less, (b) providing a stream of moving water, (c) separating said polyacrylamide particles from each other to form an airborne stream of separated polyacrylamide particles, and (d) contacting said airborne stream of separated polyacrylamide particles at a rate of about 10 grams per minute or greater with said stream of moving water, to form an aqueous composition comprised of about 0.01% or greater of dispersed polymer, by weight based on total weight of said aqueous composition, wherein said polymer composition or said dispersed polymer has a weight average molecular weight of about 100,000 or greater, and wherein said separating and said contacting are effective so that greater than about 90% by weight of said aqueous composition passes through a 50 mesh screen within about 15 minutes after said aqueous composition is formed. Another preferred embodiment further comprises adding said aqueous composition to suspended solids.

DETAILED DESCRIPTION OF THE INVENTION

The instant invention provides a method for improving the dispersal of a polymer composition in water or other aqueous solutions. Preferably, the polymer composition is dry and is comprised of a plurality of polyacrylamide particles. In this context, "dry" means that the polymer composition is comprised of about 30% water or less, preferably about 5% to about 30% water, more preferably about 8% to about 15% water, by weight based on total weight of the composition. The term "polyacrylamide" includes any cationic, anionic, nonionic or amphoteric polymer that is comprised of acrylamide or methacrylamide recurring units. The instant polyacrylamides are suitably vinyl-addition polymers and may be prepared by methods that are generally known to those skilled in the art, preferably by homopolymerization of acrylamide or by copolymerization of acrylamide with cationic, anionic, and/or nonionic comonomers. Suitable cationic comonomers include diallyldialkylammonium halides, the acid and quaternary salts of dialkylaminoalkyl(alk)acrylates and dialkylaminoalkyl(alk)acrylamides, preferably the methyl chloride, benzyl chloride and dimethyl sulfate quaternary salts of dimethylaminoethylacrylate, dimethylaminoethylmethacrylate, dimethylaminoethylacrylamide, dimethylaminoethylmethacrylamide, and diethylaminoethylacrylate, most preferably diallyidimethylammonium chloride and the methyl chloride quaternary salt of dimethylaminoethylacrylate. Suitable anionic comonomers include acrylic acid, methacrylic acid, and 2-acrylamido-2-methylpropanesulfonic acid, and salts thereof, preferably acrylic acid and sodium acrylate. Suitable nonionic comonomers include acrylonitrile and alkyl (meth)acrylates such as methylacrylate, methylmethacrylate, and ethyl acrylate. The instant polyacrylamides may also be formed by post-reaction of polyacrylamides in a manner well-known to those skilled in the art by reacting the polyacrylamide with a reagent capable of changing the chemical structure of the polymer. Suitable post-reactions of polyacrylamide include hydrolysis with acid or base to produce hydrolyzed polyacrylamide, Mannich reaction (optionally followed by quaternization to produce quaternized Mannich polyacrylamide), and reaction with hydroxylamine (or salt thereof) to produce hydroxamated polyacrylamide. Cationic and anionic polyacrylamides are preferred.

The instant polyacrylamides may be prepared in the presence of crosslinking or branching agents, such as methylenebisacrylamide, and/or in the presence of chain transfer agents, such as isopropanol and lactic acid. As the amount of crosslinking agent is increased, the resulting aqueous composition of dispersed polymer tends to contain larger amounts of water-swellable polymer. As the amount of crosslinking agent is decreased, the resulting aqueous composition of dispersed polymer tends to contain lesser amounts of water-swellable polymer. Chain transfer agents tend to reduce polymer molecular weight and to render soluble polymers which would otherwise be water-swellable because of the presence of crosslinking agents. The aqueous compositions of the instant invention may contain water-soluble dispersed polymer or water-swellable dispersed polymer, or mixtures thereof.

The polyacrylamides of the instant invention may be prepared by using techniques generally well-known to those skilled in the art, including polymerization in solution, water-in-oil emulsion, water-in-oil microemulsion or aqueous dispersion, preferably water-in-oil emulsion or water-in-oil microemulsion. Polyacrylamide particles may be formed by methods well-known to those skilled in the art, e.g., by grinding or comminution of a solution-polymerized mass of dry polyacrylamide. Spray-dried polyacrylamide particles are preferred and may be formed by spray-drying a polyacrylamide-containing dispersion, water-in-oil emulsion, or water-in-oil microemulsion as described in U.S. Pat. No. 5,849,862, which is hereby incorporated herein by reference.

The advantages of the instant methods may be most fully appreciated when the polymer composition is comprised of small polyacrylamide particles that have heretofore been very difficult to disperse by conventional methods. Preferably, at least about 90%, more preferably about 95%, of the polyacrylamide particles in the dry polymer composition have a particle size of about 300 microns or less, by weight based on the total weight of polyacrylamide particles in the polymer composition. Preferably, the polymer composition has a number average particle size of about 200 microns or less, more preferably 150 microns or less. Particle size and distribution may be determined by screening techniques well-known to those skilled in the art using standard screens as specified in ASTM E 11–95. When the instant methods are practiced as described herein, the dispersal rates of these dry polymer compositions are often similar to, or sometimes even faster than, the dispersal rates for comparable compositions comprised of larger polyacrylamide particles or having a larger number average particle size.

The instant dry polymer compositions may be provided to the user in a number of ways. Providing the dry polymer compositions may involve obtaining suitably packaged dry polymer compositions and transferring the packaged contents to a location suitable for subsequent separating and contacting steps. Examples of suitable packaging are drums and bags. Preferably the packaging is substantially impermeable to moisture. Dusting is usually undesirable during the providing process because it may result in the loss of material to the surrounding environment and may be a health or safety hazard to workers. The providing of the dry polymer compositions is preferably substantially dust-free, so that less than 1% by weight, preferably less than 0.1% by weight, of the dry polymer composition is lost during the process of providing. More preferably, the instant dry polymer compositions are obtained in bags or drums which are substantially impermeable to moisture and which are equipped with outlet valves or discharge chutes that are covered or sealed to prevent or reduce the escape of dust to permit the dry polymer compositions to be transferred in a substantially dust-free manner. Most preferably, the dry polymer compositions are obtained by the user in a lined Super Sack® (or similar product) commercially available from B.A.G. Corp., Dallas, Tex., USA and the contents transferred directly to the feed end of a suitable device for separating and contacting by positioning the Super Sack® on the device and opening the discharge chute at the lower end of the Super Sack® (or similar product) in accordance with the manufacturer's directions for the particular type of package.

The instant methods are suitably practiced by separating the polyacrylamide particles from each other to form an airborne stream of separated polyacrylamide particles, and contacting this airborne stream of separated polyacrylamide particles with a stream of moving water to form an aqueous composition. There is a tendency for polyacrylamide particles to adhere to one another when the particles are packed together, e.g., when packaged for shipping or storage, resulting in clumps of many hundreds or thousands of polyacrylamide particles that are difficult to disperse in water. The purpose of the separating step is to break these clumps apart and to disperse the polyacrylamide particles in the form of an airborne stream in which the polyacrylamide particles are separated from one another. Separating may be accomplished by any suitable method which achieves this purpose. In some cases, any clumps in the polymer composition may be broken apart mechanically by, e.g., forcing the polymer composition through an appropriate-sized screen or by means of a screw feeder, and the airborne stream may then be formed by sprinkling or spraying the polyacrylamide particles into a moving stream of water. In other cases, it may be necessary to impart a greater amount of mechanical energy to the polymer composition in order to form a suitable airborne stream. In a preferred embodiment, separating is accomplished by adding the polymer composition to the eye of a rotating disk or impeller, more preferably a centrifugal pump impeller of a centrifugal dispersion unit operating at approximately 900 to 9,000 revolutions per minute (rpm), preferably 3,000 to 6,000 rpm, such as described in detail in U.S. Pat. Nos. 5,407,975; 5,599,101; and 5,879,080; all of which are hereby incorporated herein by reference. In this embodiment, an airborne stream of separated polyacrylamide particles is created when the polyacrylamide particles are expelled outward from the eye of the rotating impeller. In another preferred embodiment, separating is accomplished by passing the polymer composition through a screen to break up the clumps, then creating an airborne stream of separated polyacrylamide particles by drawing the particles into the feed tube of an eductor, preferably the feed tube of an eductor having a pressure of 684 torr (0.9 atmospheres) or less. Eductors are well-known to those skilled in the art and use the Bernoulli principle to create sub-atmospheric pressures. In the context of the instant invention, "airborne stream of separated polyacrylamide particles" is a broad term that includes streams in which the separated polyacrylamide particles are surrounded by air, as well as streams in which the separated polyacrylamide particles are surrounded by other gases or mixtures thereof, e.g., nitrogen, helium, oxygen, etc.

The methods of the instant invention may be suitably practiced by contacting the airborne stream of separated polyacrylamide particles with a moving stream of water. In this context, "water" is a broad term that includes various types of water and aqueous solutions, including fresh water, recycled process water, water which already contains dispersed polymer, etc. Suitable devices for separating and contacting are described in U.S. Pat. No. 4,643,582. A suitable device for separating and contacting is the POLYMAIR Model 512 Polyelectrolyte Processing Module, commercially available from Acrison, Inc., of Moonachie, N.J., USA. For preferred embodiments where separating is accomplished by adding the polyacrylamide particles to the eye of a rotating impeller, it is preferable for the stream of moving water to be circumferentially disposed about the impeller as described in detail in U.S. Pat. Nos. 5,407,975; 5,599,101; and 5,879,080. A preferred device for practicing the instant invention, having a rotating impeller and circumferentially disposed stream of moving water, is a POWDERCAT™ dry polymer processing system commercially available from Norchem Industries, Tinley Park, Ill., USA. For preferred embodiments where separating is accomplished by passing the polyacrylamide particles through a screen and an eductor feed tube having a pressure of 684 torr or less, the stream of moving water is preferably the same stream that is used to provide the eductor with the sub-atmospheric pressure via the Bernoulli effect. A preferred device for practicing the instant invention, having an eductor feed tube, screen and stream of moving water, is a POL-E-DUC® polymer makedown system commercially available from ProFlow, Inc. in North Haven, Conn., USA.

The contacting of the polyacrylamide particles with the moving stream of water is suitably conducted so that it results in an aqueous composition comprised of about 0.01% or greater of dispersed polymer, preferably 0.05% or greater, more preferably 0.1% or greater, most preferably 0.2% or greater, by weight based on total weight of said aqueous composition. In some cases the aqueous composition may contain more than 5% of dispersed polymer by weight, based on total weight of aqueous composition, but more typically contains about 5% or less of dispersed polymer, preferably about 2% or less, most preferably about 1% or less, same basis. Contacting of the airborne stream of separated polyacrylamide particles with the stream of moving water is suitably conducted by adding the polyacrylamide particles to the water at an industrially useful rate of about 10 grams of polyacrylamide particles per minute or greater, preferably about 20 grams per minute or greater, most preferably about 100 to about 2000 grams per minute. Suitable aqueous compositions having the desired levels of polyacrylamide dispersed therein may be produced by adding the polyacrylamide particles more slowly, but faster rates are usually desired for practical industrial use. The water is suitably moving at a rate that is effective to produce aqueous compositions having the desired levels of dispersed polymer, taking into account the rate at which the polyacrylamide particles are contacted with the water. If the stream of moving water is moving too quickly, the level of dispersed polymer in the aqueous composition may be lower than desired. Using these guidelines, routine experimentation may be used to determine the desired movement rate for the stream of moving water.

It is preferred that the airborne stream of polyacrylamide particles be contacted with the stream of moving water soon after separating the polyacrylamide particles from each other, preferably within a few seconds or fractions of a second, to reduce any tendency for the airborne particles to settle and/or to adhere to one another. Achievement of desired levels of dispersed polymer may be accomplished through routine experimentation by controlling the stream of moving water so that it is not moving too quickly, relative to the rate at which the airborne stream of polyacrylamide particles is contacted with the moving stream of water, or by controlling the rate at which the airborne stream of polyacrylamide particles is produced and brought into contact with the water.

Separating and contacting are suitably conducted together in a manner that is effective so that greater than about 90% by weight of the aqueous composition passes through a 50 mesh screen within about 15 minutes, preferably within about 10 minutes, most preferably within about 5 minutes, after the aqueous composition is formed. If separating is not carried out effectively, the airborne stream of polyacrylamide particles may contain clumps that, upon contact with water, form fisheyes that do not pass through a 50 mesh screen. If contacting is not carried out effectively because the stream of water is moving too slowly, incoming airborne polyacrylamide particles may form fisheyes by coming into contact with, and sticking to, wet polyacrylamide particles on the surface of the stream of moving water that have not yet been swept away by the movement of the water. If fisheye formation is observed, the polyacrylamide particles in the airborne stream may need to be separated from one another more effectively by, e.g., reducing the feed rate of the polymer composition or by increasing the amount of mechanical energy imparted to the polymer composition. Using these guidelines, suitable conditions for separating and contacting may be determined by routine experimentation.

The separating and contacting steps have been carried out in accordance with the instant invention when the polymer in the resulting aqueous composition is so well dispersed that greater than about 90%, preferably greater than about 95%, by weight based on total weight of the aqueous composition passes through a 50 mesh screen within about 15 minutes, preferably within about 10 minutes, most preferably within about 5 minutes, after the aqueous composition is formed. Thus, a simple screen filtration test is suitable for determining the effectiveness of the separating and contacting steps. In this context, a "50 mesh screen" has the meaning specified in ASTM E 11–95, "Standard Specification for Wire Cloth and Sieves for Testing Purposes," for a Sieve Designation of 300 $\mu$m (Standard) or No. 50 (Alternative). ASTM E 11–95 is specifically incorporated herein by reference for the purpose of describing the instant 50 mesh screen. The instant 50 mesh screen is thus a square mesh screen having an average opening (distance between parallel wires measured at the center of the opening) of 300 $\mu$m. Suitable 50 mesh screen is commercially available from Gilson Company, Inc., of Lewis Center, Ohio, USA. The test is suitably conducted by first selecting feed rates for the polymer composition and moving water so that a suitable volume, e.g., about 100 liters or more, of an aqueous composition having the desired concentration of dispersed polymer will be produced. Separating is then carried out as described above, e.g., by adding the polymer composition to the eye of an impeller as described in U.S. Pat. Nos. 5,407,975; 5,599,101; and 5,879,080. Next, the resulting airborne stream of polyacrylamide particles is contacted with the stream of moving water. The aqueous composition is considered to be "formed" for the purposes of this invention when the airborne stream of polyacrylamide particles first comes into contact with the stream of moving water. The resulting aqueous composition comprised of dispersed polymer is then collected in a receiving tank and the separating and contacting are continued for the test period, e.g., about 5, about 10 or about 15 minutes, as measured from the time that the aqueous composition is "formed." At the conclusion of the test period, a 300 milliliter (mL) sample of the aqueous composition collected in the receiving tank is immediately withdrawn, weighed, and filtered through an approximately 6 inch by 6 inch, pre-weighed 50 mesh screen formed into a cup shape having a diameter of about 4 inches. Any fisheyes remaining on the screen after filtration are then rinsed with a few milliliters of fresh water and the screen containing the wet fisheyes is then immediately weighed and the weight of the wet fisheyes determined by difference. The weight of the fisheyes is then subtracted from the weight of the 300 mL sample prior to filtration to obtain the weight of the aqueous composition that passes through the 50 mesh screen, which is then divided by the weight of the 300 mL sample prior to filtration and multiplied by 100 to yield the percentage by weight of the aqueous composition that passes through a 50 mesh screen within the test period after the aqueous composition is formed.

The instant invention may be practiced with polyacrylamides having a broad range of molecular weights, but is particularly valuable when the molecular weight is high because polyacrylamides tend to disperse more slowly as molecular weight increases. The instant invention is suitably practiced when the polymer composition or the dispersed polymer has a weight average molecular weight of about 100,000 or greater, preferably about 1,000,000 or greater, most preferably about 10,000,000 or greater. Weight average molecular weights may be determined by light scattering, using commercially available instrumentation and techniques that are well-known to those skilled in the art.

The aqueous compositions of the instant invention may be employed to flocculate suspended solids by adding the aqueous composition to the suspended solids in an amount effective to flocculate the solids. Suitable dosages of aqueous composition effective to flocculate suspended solids may range from about 1 to about 10,000 parts polymer per part of dry solids in the suspended solids, and may be determined by routine experimentation in a manner well-known to those skilled in the art. The aqueous composition may be added directly to the suspended solids, or the aqueous composition may be diluted with water to form a treating solution that is then added to the suspended solids. Preferred treating solutions contain from about 0.001% to about 5% of dispersed polymer, preferably 0.01% to about 1%, by weight based on total weight of treating solution. Examples of preferred suspended solids which may be treated using the aqueous compositions or diluted aqueous compositions of the instant invention include biological solids (including sewage slurries, food and plant solids, and biotech slurries), mineral slurry, oily water and cellulosic slurry.

The following examples are provided to illustrate the instant invention and do not limit the scope of the instant claims in any way. All patents mentioned herein are hereby incorporated herein by reference. All percentages mentioned herein are by weight, based on total weight, unless otherwise stated.

EXAMPLES

Polyacrylamide Particles

The polymer compositions (comprised of polyacrylamide (PAM) particles) used in the following examples are shown below in Table 1. Polymers A, B and C were obtained by spray-drying the corresponding emulsions as described in U.S. Pat. No. 5,849,862. Polymers D and E were agglomerated versions of Polymers A and B, respectively. Agglomeration was conducted as described in U.S. Pat. No. 5,849,862. Polymer F was Superfloc A-130HMW® anionic PAM, available commercially from Cytec Industries, Inc, West Paterson, N.J., USA. Table 1 shows the number average particle size (microns) of each particulate polymer sample and the percentage by weight of each sample that is 300 microns or less in size.

TABLE 1

| Polymer | PAM Type | Particle size Average, μm | Distribution |
|---|---|---|---|
| Polymer A | 30 mole % anionic PAM, made by PAM hydrolysis MW >20 million | ~140 | 94% ≦ 300 μm |
| Polymer B | 55 mole % cationic PAM MW ~5 million | ~100 | 97% ≦ 300 μm |
| Polymer C | 60 mole % anionic PAM MW >20 million | ~85 | 100% ≦ 300 μm |
| Polymer D | Agglomerated Polymer A MW >20 million | ~600 | 12% ≦ 300 μm |
| Polymer E | Agglomerated Polymer B MW ~5 million | ~600 | 5% ≦ 300 μm |
| Polymer F | 34 mole % anionic PAM MW ~15 million | ~750 | 10% ≦ 300 μm |

Examples 1C–4C

Samples of Polymers A, B, D and E weighing 0.6 gram each were sprinkled into the side of the vortex of four separate stirred 300 gram samples of water at a rate of about 2–3 grams per minute to form aqueous compositions. Comparing Polymer A to D and Polymer B to E, the rates of dispersal were approximately equal and complete in about 90 minutes, as determined by following the viscosity of the resulting aqueous compositions as a function of time and by observing the dispersal characteristics of each polymer. This experiment shows that, at relatively slow rates of addition i.e. less than 10 grams per minute, there is essentially no difference in the dispersal rates of larger vs. smaller polyacrylamide particles.

Example 5C–8C

Samples of Polymers A, B, D and E weighing 0.6 gram each were sprinkled into the side of the vortex of four separate stirred 300 gram samples of water at a rate of about 30–40 grams per minute to form aqueous compositions. Polymers A and B formed clumps in the water that still had not dispersed after stirring for 330 minutes. However, Polymers D and E were completely dispersed after stirring for 330 minutes. This experiment shows that, at relatively faster rates of addition i.e. greater than 10 grams per minute, smaller polyacrylamide particles disperse much more slowly and less uniformly than larger particles.

Examples 9–14C

A series of experiments were conducted in which Polymers A, B, C and F were added to the eye of the rotating impeller of a POWDERCA™ dry polymer processing system commercially available from Norchem Industries, Tinley Park, Ill., USA, at a rate of about 1400 grams per minute. The resulting airborne stream of polyacrylamide particles were contacted with a stream of moving water circumferentially disposed about the impeller within the system. Aqueous compositions (having the concentrations of dispersed polymer shown below in Table 2, by weight based on total weight) were formed within the system when the airborne stream of polyacrylamide particles came into contact with the stream of moving water. The resulting aqueous compositions comprised of dispersed polymer were collected in a receiving tank and the quality of dispersal was determined at periodic intervals, measured (in minutes) from the time of formation, by removing 300 mL samples of the aqueous compositions. The 300 mL samples were filtered through a an approximately 6 inch by 6 inch, pre-weighed 50 mesh screen formed into a cup shape having a diameter of about 4 inches. Any fisheyes remaining on the screen after filtration were then rinsed with a few milliliters of fresh water and the screen containing the wet fisheyes was then immediately weighed and the weight of the wet fisheyes determined by difference. The weight of the fisheyes was then subtracted from the weight of the 300 mL sample prior to filtration to obtain the weight of the aqueous composition that passes through the 50 mesh screen, which was then divided by the weight of the 300 mL sample prior to filtration and multiplied by 100 to yield the percentage by weight of the aqueous composition that passed through the 50 mesh screen within the test period after the aqueous composition was formed. The results are shown below in Table 2 and show that small particle size PAMs may be dispersed by the methods of the instant invention to produce aqueous compositions more quickly than when a larger particle size PAM is used.

TABLE 2

| | | | Weight percentage of aqueous composition passing through 50 mesh screen at various times (in minutes) after formation | | | | | | | |
|---|---|---|---|---|---|---|---|---|---|---|
| Ex. No. | PAM | Conc. | 4 min. | 14 min. | 19 min. | 24 min. | 34 min. | 44 min. | 49 min. | 64 min. |
| 9 | B | 0.2% | 99.9 | 100 | | 100 | 100 | 100 | | |
| 10 | B | 0.4% | 99.5 | 99.9 | | 100 | 100 | 100 | | |

TABLE 2-continued

Weight percentage of aqueous composition passing through 50 mesh screen at various times (in minutes) after formation

| Ex. No. | PAM | Conc. | 4 min. | 14 min. | 19 min. | 24 min. | 34 min. | 44 min. | 49 min. | 64 min. |
|---------|-----|-------|--------|---------|---------|---------|---------|---------|---------|---------|
| 11  | A | 0.2% | 98.9 | 99.7 |      |      | 99.8 |      | 99.8 |      |
| 12  | A | 0.3% | 98.8 |      |      |      | 99.5 |      |      |      |
| 13  | C | 0.2% | 99.4 | 99.9 |      | 99.9 | 99.9 | 100  |      |      |
| 14C | F | 0.2% | 56.2 |      | 83.2 |      | 89.8 |      |      | 92.3 |

Example 15–18C

Polymers A, B, D, and E were dispersed as described in Examples 9–14C, except that the polymers were added at a rate of about 450 grams per minute, to form aqueous compositions having a concentration of about 0.3%, by weight based on total weight. The results are shown below in Table 3. These results show that small polyacrylamide particles may be dispersed by the methods of the instant invention just as quickly, or even more quickly, than larger size particles of the same polymer.

TABLE 3

Weight percentage of aqueous composition passing through 50 mesh screen at various times (in minutes) after formation

| No. | PAM | 5 min. | 10 min. | 15 min. | 20 min. | 25 min. | 30 min. | 35 min. | 40 min. | 45 min. | 60 min. |
|-----|-----|--------|---------|---------|---------|---------|---------|---------|---------|---------|---------|
| 15  | A | 98.9 |      | 99.3 |      | 99.3 |      | 99.2 |      | 99.2 | 99.3 |
| 16C | D | 87.9 |      | 99.6 |      | 99.6 |      | 99.8 |      | 99.9 | 99.7 |
| 17  | B | 99.9 | 100  |      | 99.9 |      | 99.9 |      | 99.9 |      |      |
| 18C | E | 99.2 | 99.7 |      | 99.9 |      | 99.8 |      | 99.7 |      |      |

Example 19C

An attempt was made to disperse Polymer B into water to form an aqueous composition having a polymer concentration of 0.4% using a Model 7020 dissolution unit, available commercially from Excell Design and Construction, Somerset, N.J. This dissolution unit consists of an eductor fitted with a polymer powder feeder to control the powder feed rate. The feeder functions by dropping polymer powder from a hopper onto a flat disk about 50 centimeters in diameter, rotating at a speed of about 2–5 rpm. The polymer powder is not fed through a screen. The disk carries the powder around to a tube which feeds the suction side of an eductor. The aqueous composition resulting from this attempt contained numerous gel clumps, more than 20% of which could not pass through a 50 mesh screen within 30 minutes after formation.

Examples 20–22

A Pol-E-Duc PowerDown Eductor dissolution unit, commercially available from ProFlow Modular Systems of North Haven, Conn., USA, was used to disperse Polymer A in a series of experiments conducted at different feed rates. Airborne streams of polyacrylamide particles were formed by passing Polymer A through a screen (openings about 1 cm) and then through an eductor feed tube. The water flow through the eductor was about 200 liters per minute and generated a subatmospheric pressure in the feed tube of less than 684 torr. The polymer contacted the water in the eductor at feed rates of 570, 750 and 950 grams per minute, forming smooth aqueous compositions in each case having dispersed polymer concentrations of about 0.3–0.5%. Greater than 90% by weight of the formed aqueous compositions were capable of passing though a 50 mesh screen within 15 minutes after formation.

Example 23

A Polymair Model 512 Polyelectrolyte Processing Module, commercially available from Acrison, Inc., Moonachie, N.J., USA, was used to disperse Polymer A. Airborne streams of polyacrylamide particles were formed by adding Polymer A to the cyclone wetting chamber of the module. The polymer contacted the water in the module at a feed rate of 820 grams per minute, forming a smooth aqueous composition having a dispersed polymer concentration of about 0.2%, by weight based on total weight. Greater than 90% by weight of the formed aqueous composition was capable of passing though a 50 mesh screen within 15 minutes after formation.

Example 24

The aqueous composition formed in Example 23 was used to flocculate a coal refuse slurry (about 5% solids) at a dosage of about 10 parts polymer per million parts refuse slurry, by weight. Settling performance was comparable to performance observed with aqueous compositions formed by conventional dispersal methods.

Examples 25–26

The aqueous compositions formed in Examples 9 and 10 were used to flocculate a sewage sludge slurry (about 2% solids) over a polymer dosage range of about 0.5% to about 1%, by weight based on dry weight of slurry. Settling performance was comparable to performance observed with aqueous compositions formed by conventional dispersal methods.

We claim:

1. A method for improving the dispersal of a polymer composition in water, comprising (a) providing a dry polymer composition comprised of a plurality of polyacrylamide particles, wherein at least about 90% by weight of said polyacrylamide particles have a particle size of about 300 microns or less, (b) providing a stream of moving water; (c) separating said polyacrylamide particles from each other to form an airborne stream of separated polyacrylamide particles, and (d) contacting said airborne stream of separated polyacrylamide particles at a rate of about 10 grams per minute or greater with said stream of moving water, to form an aqueous composition comprised of about 0.01% or greater of dispersed polymer, by weight based on total weight of said aqueous composition, wherein said polymer composition or said dispersed polymer has a weight average molecular weight of about 100,000 or greater, and wherein said separating and said contacting are effective so that greater than about 90% by weight of said aqueous composition passes through a 50 mesh screen within about 15 minutes after said aqueous composition is formed.

2. A method as claimed in claim 1 wherein said separating is accomplished by adding said polyacrylamide particles to the eye of a rotating impeller and wherein said stream of moving water is circumferentially disposed about said impeller.

3. A method as claimed in claim 1 wherein said separating is accomplished by passing said polyacrylamide particles through a screen and an eductor feed tube having a pressure of 684 torr or less.

4. A method as claimed in claim 1 wherein said polyacrylamide particles are spray-dried.

5. A method as claimed in claim 1 wherein said polymer composition has a number average particle size of about 200 microns or less.

6. A method as claimed in claim 1 wherein said aqueous composition is comprised of about 0.1% or greater of dispersed polymer, by weight based on total weight of said aqueous composition.

7. A method as claimed in claim 1 wherein said aqueous composition is comprised of about 0.2% or greater of dispersed polymer, by weight based on total weight of said aqueous composition.

8. A method as claimed in claim 1 wherein said polymer composition or said dispersed polymer has a weight average molecular weight of about 1,000,000 or greater.

9. A method as claimed in claim 1 wherein said polyacrylamide is cationic or anionic.

10. A method as claimed in claim 1 wherein said separating and said contacting are effective so that greater than about 90% by weight of said aqueous composition passes through a 50 mesh screen within about 5 minutes after said aqueous composition is formed.

11. A method as claimed in claim 1 wherein said separating and said contacting are effective so that greater than about 95% by weight of said aqueous composition passes through a 50 mesh screen within about 15 minutes after said aqueous composition is formed.

12. A method as claimed in claim 1 wherein said providing is substantially dust-free.

13. A method as claimed in claim 1 which further comprises diluting said aqueous composition with water.

14. A method as claimed in claim 1 which further comprises adding said aqueous composition to suspended solids.

15. A method as claimed in claim 14 wherein said suspended solids are selected from the group consisting of biological solids, mineral slurry, oily water and cellulosic slurry.

16. A method for improving the dispersal of a polymer composition in water, comprising (a) providing a dry polymer composition comprised of a plurality of spray-dried cationic or anionic polyacrylamide particles, wherein at least about 90% by weight of said polyacrylamide particles have a particle size of about 300 microns or less, (b) providing a stream of moving water, (c) separating said polyacrylamide particles from each other to form an airborne stream of polyacrylamide particles, and (d) contacting said airborne stream of separated polyacrylamide particles at a rate of about 10 grams per minute or greater with said stream of moving water to form an aqueous composition comprised of about 0.2% or greater of dispersed polymer, by weight based on total weight of said aqueous composition, wherein said polymer composition or said dispersed polymer has a weight average molecular weight of about 1,000,000 or greater, and wherein said separating and said contacting are effective so that greater than about 90% by weight of said aqueous composition passes through a 50 mesh screen within about 15 minutes after said aqueous composition is formed.

17. A method as claimed in claim 16 wherein said separating is accomplished by adding said polyacrylamide particles to the eye of a rotating impeller and wherein said stream of moving water is circumferentially disposed about said impeller.

18. A method as claimed in claim 16 wherein said separating is accomplished by passing said polyacrylamide particles through a screen and an eductor feed tube having a pressure of 684 torr or less.

* * * * *